Patented June 25, 1940

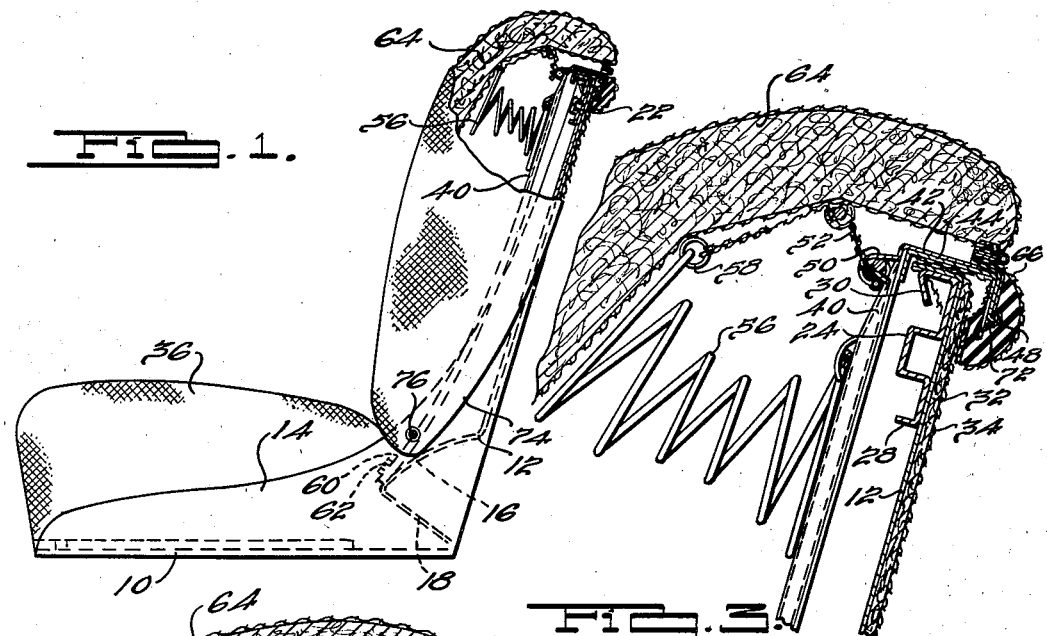
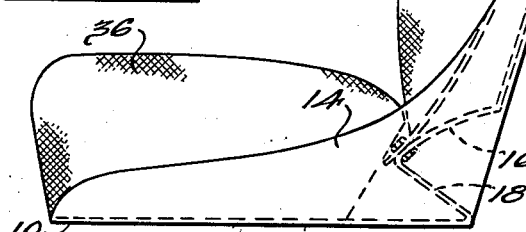

2,205,465

UNITED STATES PATENT OFFICE 2,205,465

SEAT BACK CUSHION

Harry A. Campbell, Detroit, Mich., assignor to Chrysler Corporation, Highland Park, Mich., a corporation of Delaware Application October 30, 1937, Serial No. 171,821

1 Claim. (Cl. 155—184)

This invention relates to a seat for an automobile and particularly to the back portion thereof.

An object of the invention is to provide a detachable cushion for the seat back which may be secured to the seat back as a complete unit and to provide a padded portion which embraces the upper edge of the seat back.

A further object of the invention is to provide concealed securing means for the several parts of the cushion and to cover the upholstery securing means on the seat back by the upholstery or padded portion of the cushion.

Other objects and advantages of the invention will be more fully understood from the following description taken in connection with the accompanying drawing, in which:

Fig. 1 is a side elevation of an automobile seat, parts being broken away and in section.

Fig. 2 is an enlarged sectional view of the upper portion of the seat back showing the relation of the cushion relative to the seat back just prior to final assembly.

Fig. 3 is a view corresponding to Fig. 2 but showing the cushion in assembled position embracing the upper edge of the seat back.

Fig. 4 is a side elevation of an automobile seat showing a modified form of the invention in which the side edges of the cushion are between side flanges connecting the bottom of the seat with the seat back whereas in Fig. 1 the side edges of the cushion overlap the connecting flange; and Fig. 5 is a sectional view of the upper portion of a seat back showing a modified construction.

Referring to the drawing, the seat is shown having a bottom portion 10 and an integrally connected back portion 12. The portions 10 and 12 are connected along their edges by side flanges 14 and the back portion has a depressed forwardly extending portion 16 at its lower edge to provide a toeboard 18 for occupants, behind the seat, when used as a front seat of an automobile. The upper edge of the seat back 12 has a forwardly extending flange 20. Adjacent the upper edge of the back 12 and below the flange 20 is a reinforcing strip 22 having a raised rib 24 and upper and lower forwardly extending flanges 26 and 28 respectively. The upper flange 26 has at its free edge a plurality of downwardly and rearwardly extending prongs 30. The reinforcing strip 22 is secured to the back 12 preferably by welding. A padding 32 may be arranged on the rear surface of the back 12 and a fabric material 34 has its upper edge hooked into the prongs 30 extending over the flange 20, back 12 and padding 32.

A bottom cushion 36 is removably supported on the bottom portion 10 of the seat. This cushion is of the well-known type consisting of a frame, springs and padding.

The seat back cushion has a frame 40 provided with a rearwardly extending flange 42 at substantially right angles to the frame 40. A channel 44 is secured underneath the flange 42 with its open side directed downwardly. The free side 46 of the channel 44 is provided with a plurality of struck out tabs 48 for receiving upholstery material, hereinafter more fully described. The forward face of the frame 40 is provided with a plurality of struck out tabs 50 for receiving spring binding material 52. The tabs 50 are pressed over a bead 54 secured to the edge of the binding 52.

Coil springs 56, of the usual design, are carried on the forward face of the frame 40 and are attached to the binding 52 as shown at 58. The lower edge of the frame 40 is provided with apertured straps 60 for receiving bolts 62 which secure the lower edge of the frame to the depressed portion 16.

A padding 64 is arranged over the forward surface of the springs 56 and extends from the bottom of the frame 40 upwardly over the flange 42 and channel 44. At the outer edge of the padding 64 there is a flexible flap 66 which may be of fabric material and stitched to the padding 64. A slotted rubber moulding 68 having fabric 70 secured to its outer surface is carried by the outer edge of padding 64 preferably secured thereto by the stitching securing the flap 66. The rubber moulding, except for the stitching, is free from the flap 66 and is slotted as at 72. To apply the padding 64 to the frame 40 the padding 64 is placed on the springs 56 and the flap 66 is drawn down over the outer free side 46 of the channel 44 and a bead 72 at the edge thereof is held in position by the tabs 48 being bent down into gripping engagement. The rubber moulding 68 is then opened up to fit over the tabs 48 and the lower free edge of the channel side wall 46 to a position shown on the drawing.

In the form of the invention shown in Figs. 1, 2 and 3 the padding 64 is provided with rearwardly extending side flanges 74 which fit over the side edges of the frame 40.

When it is desired to assemble the unitary seat back cushion on the seat back it is placed as a completely assembled unit on the forward face of the seat back 12 in a position shown in Fig. 2. The cushion is then slid downwardly with the channel 46 fitting over the inwardly extending flange 20, the rubber 68 covering the joint and serving as a padding, as shown in Fig. 3. The flanges 74 are then secured to the flanges 14 by screws 76 and the bolts 62 inserted through the straps 60 securing the lower edge in position.

In the form of the invention shown in Fig. 4 the edges of the cushion and padding 64' are inserted between the flanges 14, whereas in Fig. 1 the flanges 74 are on the outside of the flanges 14.

The structure shown in Fig. 5 is substantially the same as shown in the other figures except that the rubber moulding 68 is secured to the inner lining 78 of the padding 64 and the outer covering 80 extends around the outer surface of the moulding 68. The beaded edge of the lining 78 is held in the slot 72 when the moulding embraces the side 46 of the channel 44. In this form of the invention there are no tabs, such as tabs 48 on the side wall 46 of Figs. 2 and 3, the padding being held in position by the slotted moulding 68 engaging the side wall 6 of the channel 44.

It will be understood that various changes, including the size, shape and arrangement of parts, may be made without departing from the spirit of my invention and it is not my intention to limit its scope other than by the terms of the appended claim.

What I claim is:

A seat structure for an automobile comprising in combination, a supporting back member and a removable cushion structure, said cushion structure including a frame member having a rearwardly and downwardly extending flange at its upper edge for embracing the upper edge of said back member and a padding secured to the bottom of said frame member and extending upwardly over the front face of said frame and detachably secured to the lower edge of said flange by a yieldable attaching member that is adapted to yieldably engage the upper edge of said back member.

HARRY A. CAMPBELL.